(12) United States Patent
Svensson

(10) Patent No.: US 8,720,941 B1
(45) Date of Patent: May 13, 2014

(54) AIRBAG MODULE WITH BENDING CUSHION

(71) Applicant: Autoliv ASP, Inc., Ogden, UT (US)

(72) Inventor: Lasse David Svensson, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/838,841

(22) Filed: Mar. 15, 2013

(51) Int. Cl.
B60R 21/16 (2006.01)
(52) U.S. Cl.
USPC ........................................ 280/730.2
(58) Field of Classification Search
USPC ........................... 280/730.2, 743.2
IPC .............................. B60R 21/16, 21/213, 21/214
See application file for complete search history.

(56) References Cited

U.S. PATENT DOCUMENTS

| | | | | |
|---|---|---|---|---|
| 7,823,922 B2 * | 11/2010 | Mitchell et al. | ............ | 280/743.2 |
| 8,020,888 B2 * | 9/2011 | Cheal et al. | ................ | 280/730.2 |
| 8,186,710 B2 * | 5/2012 | Cheal et al. | ................ | 280/730.2 |
| 8,590,926 B2 * | 11/2013 | Saimura et al. | ............ | 280/730.2 |
| 2006/0290122 A1 * | 12/2006 | Woydick | .................... | 280/743.2 |
| 2007/0046009 A1 * | 3/2007 | Miura et al. | ................ | 280/743.2 |
| 2008/0191453 A1 * | 8/2008 | Mansson et al. | ........... | 280/730.2 |
| 2010/0025971 A1 * | 2/2010 | Steinbach et al. | ............ | 280/729 |

* cited by examiner

*Primary Examiner* — Faye M. Fleming
(74) *Attorney, Agent, or Firm* — Stoel Rives LLP

(57) ABSTRACT

A bending cushion airbag can include a base portion and at least one pair of fluidly connected and substantially coplanar lobes. The fluidly connected lobes may be folded with respect to the base portion and sewn, or otherwise joined together, such that upon deployment/inflation, the lobes are prevented from returning to the coplanar state. In an inflated/deployed state, the lobes are configured to extend inboard from the base portion and at an angle (curved) relative to the base portion. For example, the inflated lobes may extend substantially perpendicular to the base portion, so as to form a bending cushion or pocket region near the junction of the base portion and the pair of lobes.

20 Claims, 13 Drawing Sheets

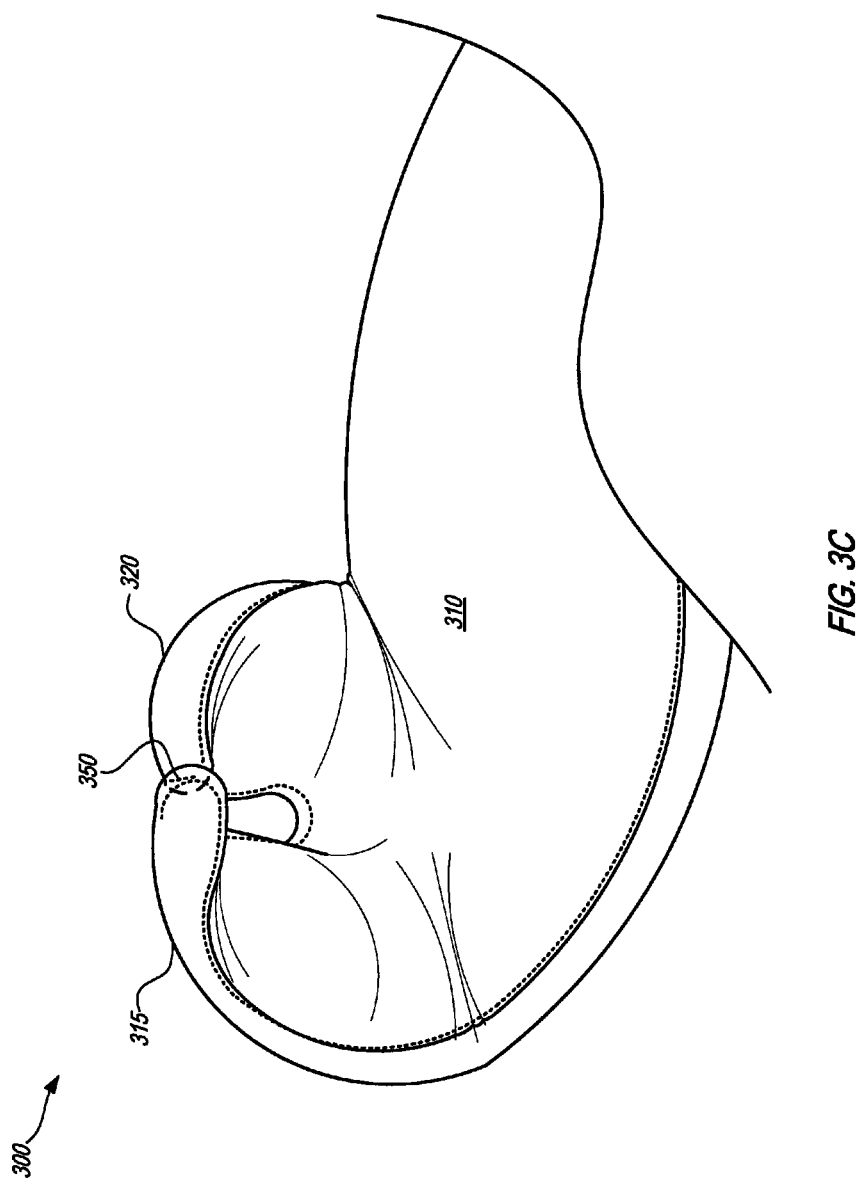

AIRBAG MODULE WITH BENDING CUSHION

BACKGROUND

Airbags can be mounted in a steering wheel or other vehicular structure and deployed so as to prevent a vehicle occupant from impacting the vehicular structure in a collision event. In some instances, the airbags can suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3C illustrates a perspective view of the airbag module in the inflated state with the lobes sewn together and extending from the base portion;

DETAILED DESCRIPTION

Figure 1A:
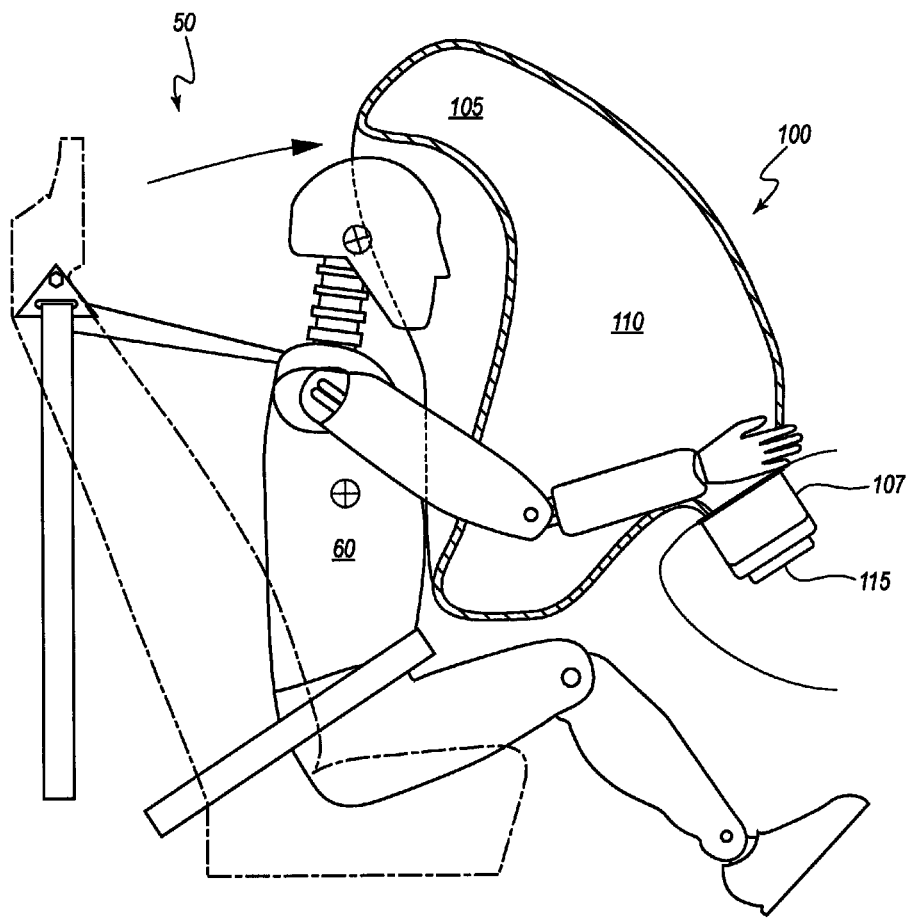
FIG. 1A is a side view of an embodiment of a vehicle occupant engaging a bending cushion airbag packaged within a frontal structure of a vehicle.

It will be readily understood that the components of the embodiments as generally described and illustrated in the figures herein could be arranged and designed in a wide variety of configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" and "attached directly to" refer to interaction between two or more entities which are in direct contact with each other and/or are separated from each other and/or coupled to each other by a fastener of any suitable variety (e.g., mounting hardware, adhesive, stitching), regardless of whether the fastener extends through additional components. The phrase "fluid communication" is used in its ordinary sense, and is broad enough to refer to arrangements in which a fluid (e.g., a gas and/or a liquid) can flow from one element to another element when the elements are in fluid communication with each other.

Inflatable airbag systems may be used to reduce or minimize occupant injury in a collision scenario. Airbag modules, as described herein, may be installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable front airbag, such as a driver airbag, a side airbag, or any other airbag type in other embodiments. The principles discussed herein may be applied to any airbag to create a bending cushion with "three-dimensional" or curved portions. The curved portions of a bending cushion may be configured to form a pocket region configured to receive a vehicle occupant, or at least a portion thereof.

During installation, airbags may be rolled and/or folded, and retained in a packaged state behind a cover. During a collision event, an inflator may be triggered to rapidly fill the airbag with inflation gas. The airbag may then rapidly change from a rolled and/or folded configuration (also referred to as a packaged or undeployed configuration) to an expanded (inflated) or deployed configuration. For example, the expanding airbag can open the cover (e.g., tear through a burst seam or open a door-like structure) so as to exit a housing. The inflator may be triggered by any suitable device or system, and the triggering may be in response to and/or influenced by one or more vehicle sensors.

Certain embodiments of airbag assemblies (airbag modules) that are disclosed herein are particularly well suited for use as driver airbags or side curtain airbags and may be mounted in a steering wheel or side portion of the vehicle structure. An airbag module may include an airbag(s) that is configured to deploy in an advantageous way. For example, in some embodiments, an airbag may include a base portion and one or more sewn lobe portions configured to extend inboard (toward the interior of the vehicle) and at an angle relative to the base portion.

In various embodiments, a base portion of an airbag includes two lobes each extending from the base portion in approximately the same plane as the base portion in an unassembled and undeployed state. The two lobes may be folded with respect to the base portion and joined together. For example, the two lobes may be sewn to one another while in the folded position. The two lobes may be folded so as to at least partially overlap. In various embodiments, the two lobe portions are sewn together such that in an inflated state, the lobes remain joined and are prevented from returning to their original, unassembled state, in which the lobes extended from the base portion in approximately the same plane as the base portion.

That is, in the inflated state, the two lobes may remain joined and be configured to extend inboard and at an angle relative to the base portion to form a curved or bending cushion. The curved or bending cushion may form a pocket or other three-dimensional curved shape adapted to catch or otherwise receive at least a portion of a vehicle occupant. One or more of the foregoing advantages and/or other advantages of various embodiments described below will be evident from the present disclosure.

Figure 1B:
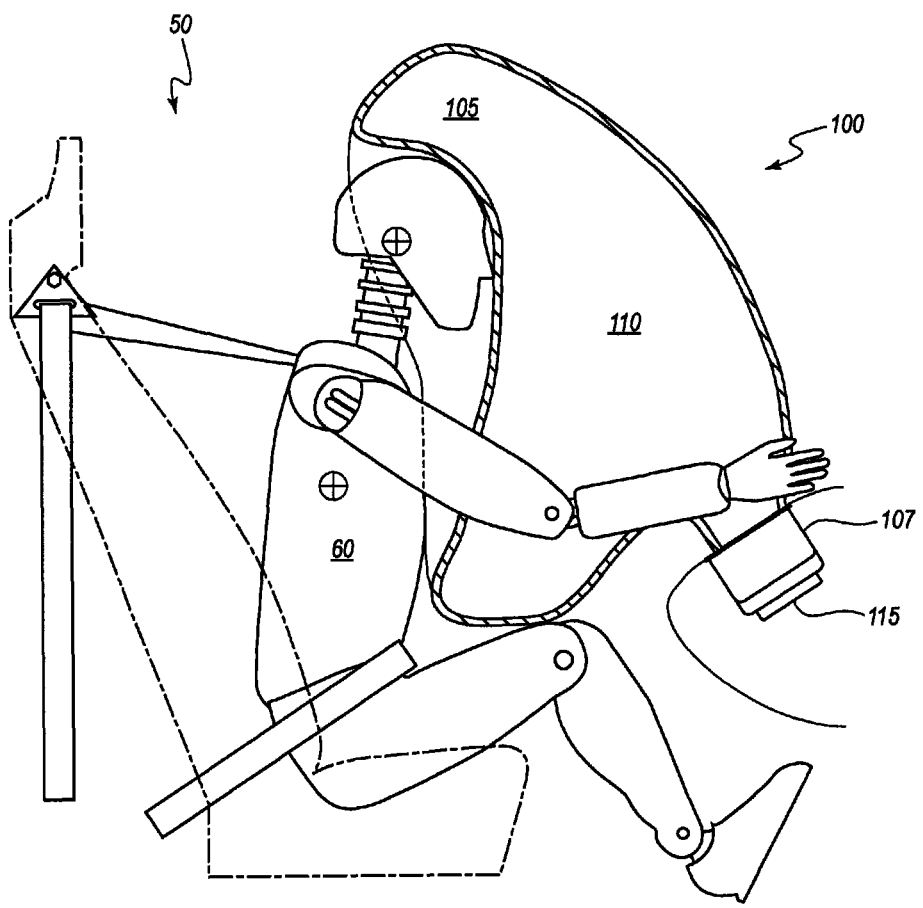
FIG. 1B is another side view of the airbag assembly showing the vehicle occupant engaging a pocket formed at the junction of the base portion of the airbag and the inboard protrusion portion of the airbag.

FIGS. 1A and 1B depict a vehicle occupant 60 engaging, at 50, a bending cushion airbag 100 packaged within a frontal structure of a vehicle. The bending cushion airbag 100 may be part of an airbag module or airbag assembly. The airbag module may include an inflatable bending cushion airbag 100 packaged within an airbag housing 107. The bending cushion airbag may be selectively inflated by an inflator 115.

The bending cushion airbag 100 may include an inflatable base portion 110 and an inflatable lobe portion 105. The inflatable lobe portion 105 may include two or more lobes fluidly connected to the base portion 110. The lobes may be sewn together such that in the inflated state, as depicted, the lobes remain joined and extend inboard (toward the interior of the vehicle) with respect to the base portion 110. As illustrated, the sewn lobes form a three-dimensional region of the airbag cushion that bends inboard to create a pocket or receiving region.

FIG. 1B illustrates the head of the vehicle occupant 60 engaging the pocket formed by the bending region joining the lobe portion 105 and the base portion 110. The lobe portion 105 creating the pocket region is illustrated near the top of a frontal airbag 100. It will be appreciated that a similar pocket or bending region may be formed on any airbag, such as a frontal airbag or a side airbag, and may be formed near the bottom, top, and/or side(s) of an airbag. For example, it may be desirable to form a bending cushion pocket on the front portion of a side impact airbag, thereby creating a pocket in a front corner of an interior of a vehicle.

The various portions of the airbag 100, such as the base portion 110, the lobes that form the lobe portion 105, and/or other panels, portions, or cushion regions may also be referred to as airbag cushion membranes, and may be formed of any suitable material. For example, in some embodiments, the portions of the airbag 100 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

In various embodiments, the airbag 100 can further include a deflector (not illustrated) that is configured to direct inflation gases in a desired manner or pattern during deployment of the airbag. In some embodiments, the airbag 100 can further include a tether (not illustrated), which can be attached to the base portion 110 and/or one or more of the lobes forming the lobe portion 105. The tether may function as a depth delimiting tether and/or as a stabilizing tether. The tether can assist with achieving a desired profile of the airbag 100 during deployment, once the airbag 100 is fully inflated, and/or during ride down of the vehicle occupant 60 after the vehicle occupant 60 impacts the inflated airbag 100. The tether may be formed of any suitable material. For example, in some embodiments, the tether and the airbag 100 may be formed of the same material. In other embodiments, the tether may be formed of a material that is stiffer, thicker, and/or stronger than the material of which the portions 105 and 110 are formed.

Figure 2A:
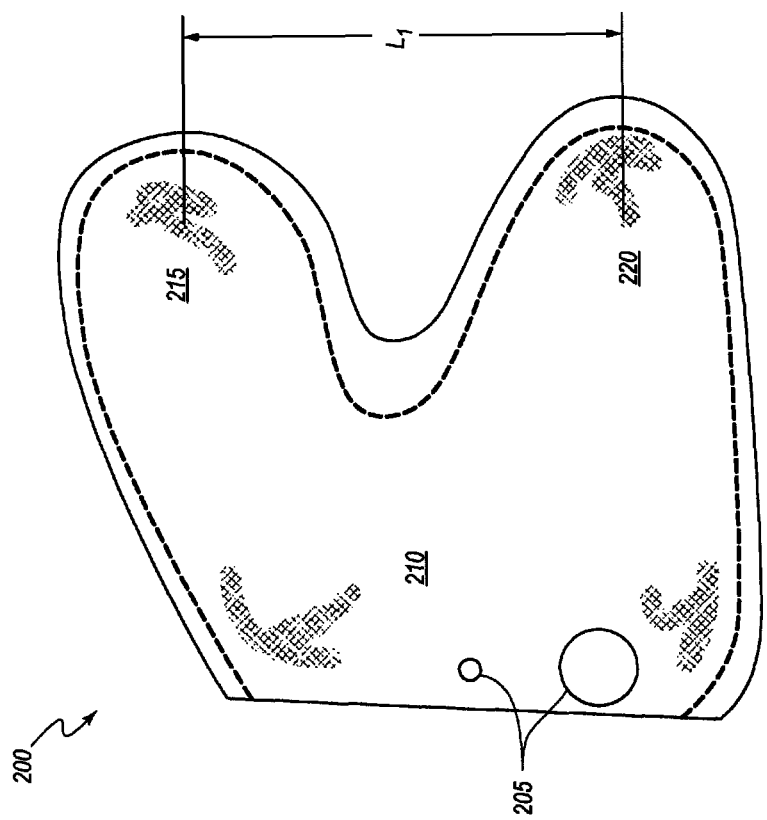
FIG. 2A is a front view of an airbag module including a base portion and two lobes in an unassembled and undeployed state.

FIG. 2A depicts a front view of an airbag module 200 including a base portion 210 and two lobes 215 and 220 in an unassembled and undeployed state. As illustrated, the first lobe 215 and the second lobe 220 may be fluidly connected to and extend from the base portion 210 of the airbag module 200. The airbag module 200 may further include an inflator, inflation apertures, various deflectors, various tethers, fastening apertures, and/or other functional features commonly utilized. For example, apertures 205 may facilitate the inflation of the airbag module 200.

As illustrated, the first lobe 215 and the second lobe 220 may be fluidly connected to the base portion 210 and taper to rounded or squared ends. Alternatively, the first and second lobes 215 and 220 may be fluidly connected to the base portion 210 at a relatively narrow junction and then widen to rounded or squared ends, as described in conjunction with FIG. 4. The ends of each lobe 215 and 220 may be separated by a distance $L_1$. The distance $L_1$ may vary depending on the size of the airbag module 200, the size of the base portion 210, the size of the lobes 215 and 220, and/or the desired three-dimensional effect (the amount of bending). As illustrated, in an unassembled state, the lobes 215 and 220 may extend from the base portion 210 along substantially the same plane as the base portion 210.

Figure 2B:
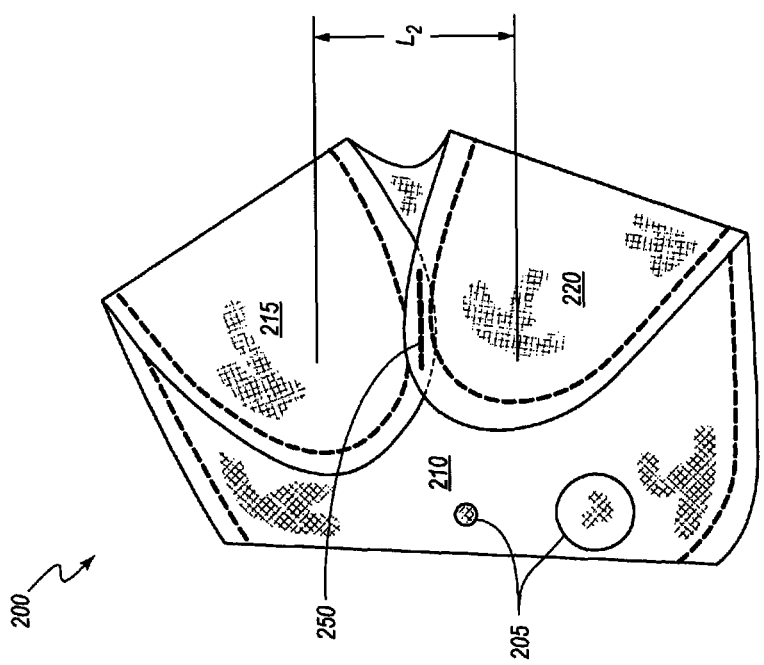
FIG. 2B illustrates the front view of the airbag module with the lobes folded with respect to the base portion and sewn together.

As illustrated in FIG. 2B, prior to packing the airbag module 200, the lobes 215 and 220 are folded with respect to the base portion 210. The lobes 215 and 220 may be folded at least slightly inward so as to overlap one another. In the folded state, the ends of each lobe 215 and 220 may be separated by a distance $L_2$ that is less than the distance $L_1$.

In some embodiments, a middle or end portion of the lobes 215 and 220 may be wide enough that they overlap without being folded inward. In the various embodiments, the lobes 215 and 220 may be folded and sewn, at 250, such that they cannot (without being deformed) return to their unfolded state (depicted in FIG. 2A), in which the lobes 215 and 220 extend substantially along the same plane as the base portion 210. Rather, the lobes 215 and 220 may be packaged in the folded and sewn (or otherwise joined) state depicted in FIG. 2B. In some embodiments, the airbag module 200 may be additionally folded and/or rolled for packaging.

Figure 3A:
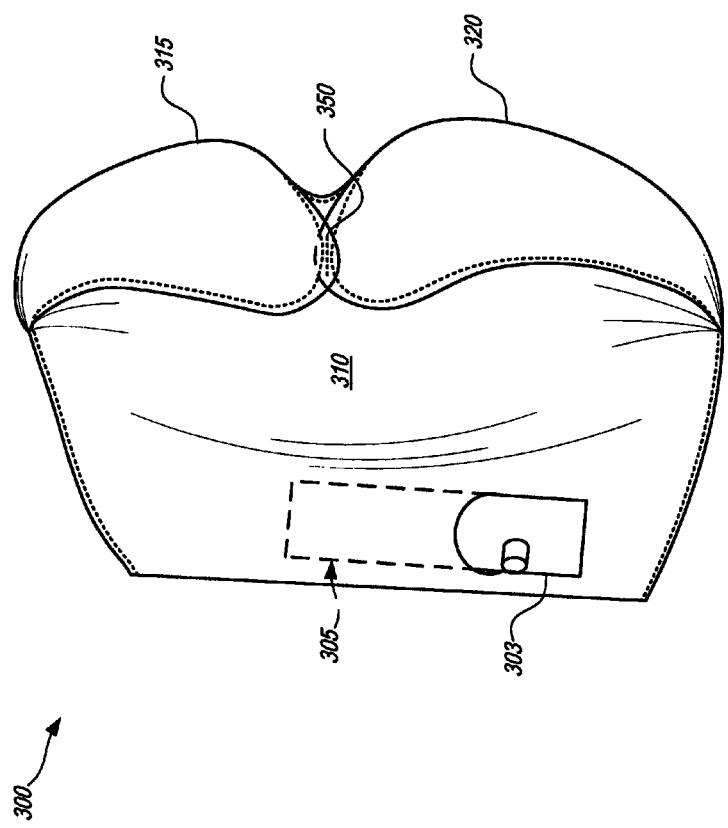
FIG. 3A is a front view of an airbag module in a deployed (inflated) state with the lobes sewn together and extending inboard from a base portion.

FIG. 3A is a front view of an airbag module 300 similar to those depicted in FIGS. 2A-2B in a deployed (inflated) state with the lobes 315 and 320 sewn together and extending inboard from the base portion 310. The airbag module 300 may include one or more inflation apertures 305 and/or mounting features 303, as applicable to the airbag type and/or location as will be appreciated by one of skill in the art.

In the illustration, the inflated base portion 310 lies substantially in the same plane as the page, while the inflated lobes 315 and 320 extend out from the page at an angle (e.g., perpendicular to the page). The lobes are sewn (or otherwise joined), at 350, to create the bending cushion with lobes 315 and 320 that extend inboard from the base portion 310. The joining of the lobes 315 and 320 via the sewn thread 350 prevents the lobes 315 and 320 from completely unfolding from the folded state (see FIG. 2B) and returning to an unassembled state (see FIG. 2A) during inflation/deployment.

Figure 3B:
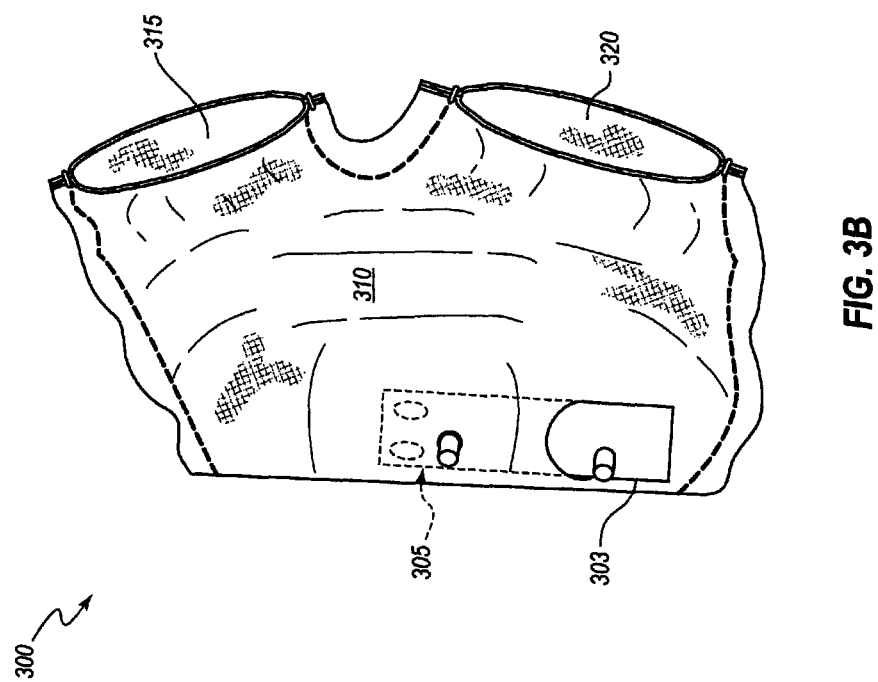
FIG. 3B illustrates a front view of the airbag module in the inflated state with the lobes illustrated as cross-sections.

FIG. 3B illustrates a front view of the airbag module 300 in the inflated state with the lobes 315 and 320 illustrated as cross-sections. As illustrated, the inflated base portion 310 of the airbag module 300 lies substantially in the plane parallel to the page. The inflated base portion 310 curves (bends) into the inflated lobes 315 and 320 (shown as cross-sections) that extend outward from the page. The lobes 315 and 320 may extend perpendicular to the base portion 310 or at another angle, e.g., acute or obtuse, so as to form a pocket in conjunction with the base portion 310.

FIG. 3C illustrates a perspective view of the airbag module 300 in the inflated state with the lobes 315 and 320 sewn together and extending at an angle relative to the base portion 310. As illustrated, the bending cushion shape of the airbag module 300 forms a pocket at the junction of the base portion 310 and the lobes 315 and 320.

Figure 4:
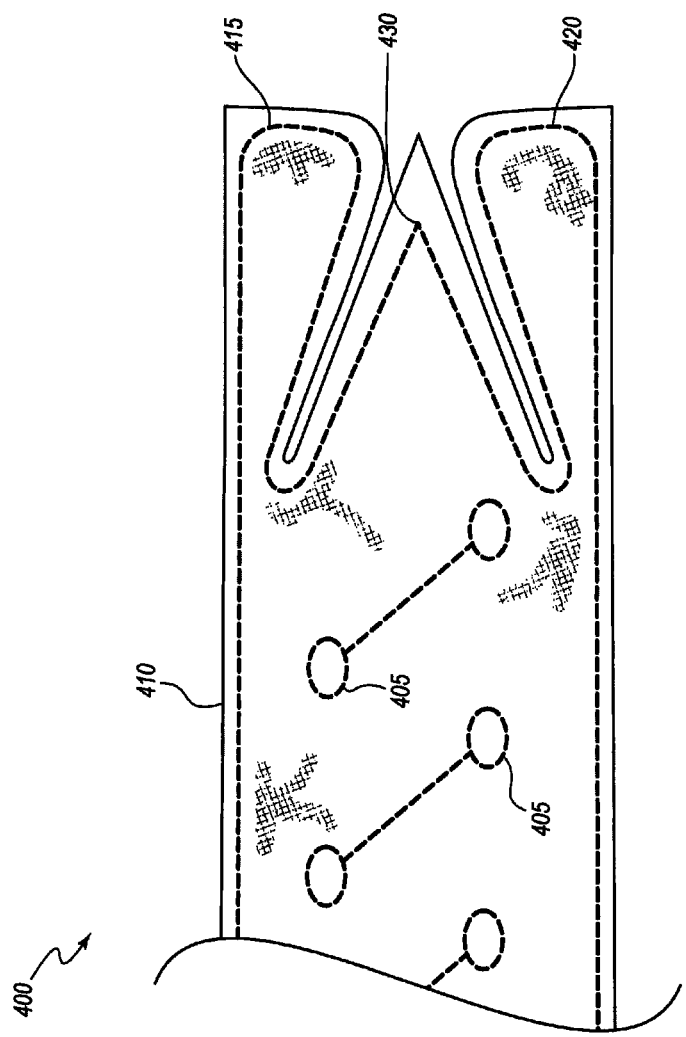
FIG. 4 is a front view of an embodiment of an airbag module including a base portion, two lobes, and a sail portion in an unassembled and undeployed state.

FIG. 4 depicts a front view of an embodiment of an airbag module 400 including a base portion 410, two lobes 415 and 420, and a sail portion 430 in an unassembled and undeployed state. In the unassembled state, the first lobe 415, the second lobe 420, and the sail portion 430 extend on substantially the same plane as the base portion 410. As will be appreciated by one of skill in the art, any number of mounting and/or inflation apertures 405 may be incorporated in the airbag module 400.

Figure 5A:
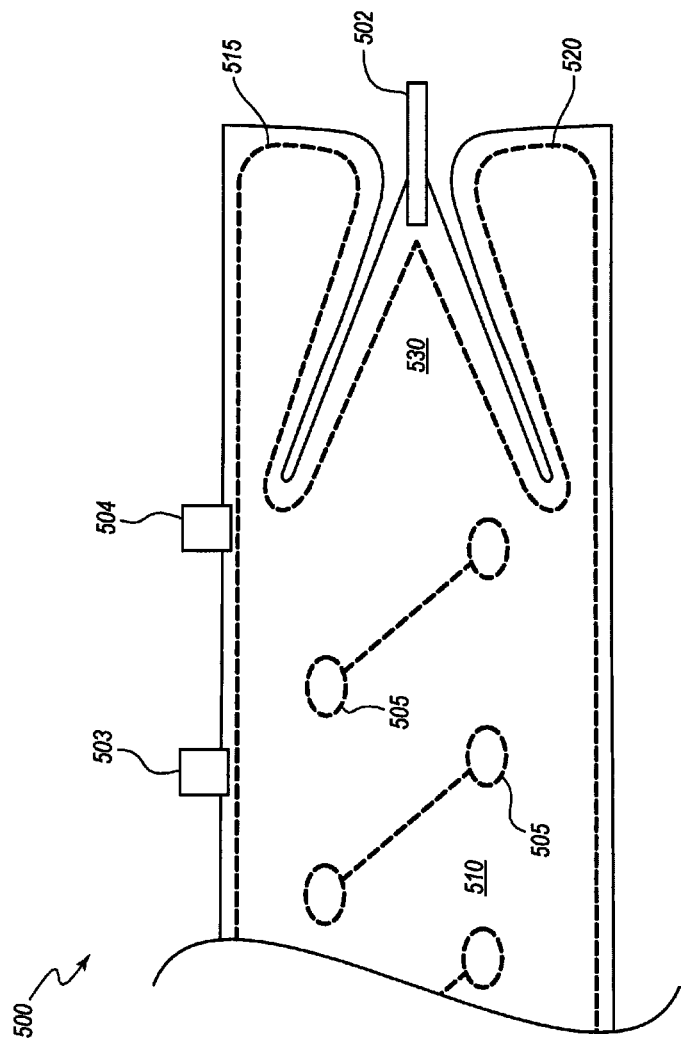
FIG. 5A is a front view of an embodiment of an airbag module including a base portion, two lobes, a sail portion, and a plurality of tethers in an unassembled and undeployed state.

FIG. 5A depicts a front view of an embodiment of an airbag module 500 similar to the airbag module 400 described in conjunction with FIG. 4. As illustrated, the airbag module 500 includes a base portion 510, two lobes 515 and 520, and a sail portion 530 in an unassembled and undeployed state. In addition, the airbag module 500 may include one or more tabs 503 and 504 and/or tethers 502 for mounting and/or controlling the deployment of the airbag module 500. As will be appreciated by one of skill in the art, any number of mounting and/or inflation apertures 505 may be incorporated in the airbag module 500.

In the unassembled state, the first lobe 515, the second lobe 520, and the sail portion 530 extend on substantially the same plane as the base portion 510. The relative thicknesses and/or expansion capacity of each portion (i.e., base portion 510, lobes portion(s) 515 and 520) may vary based on a desired inflation characteristic or shape.

Figure 5B:
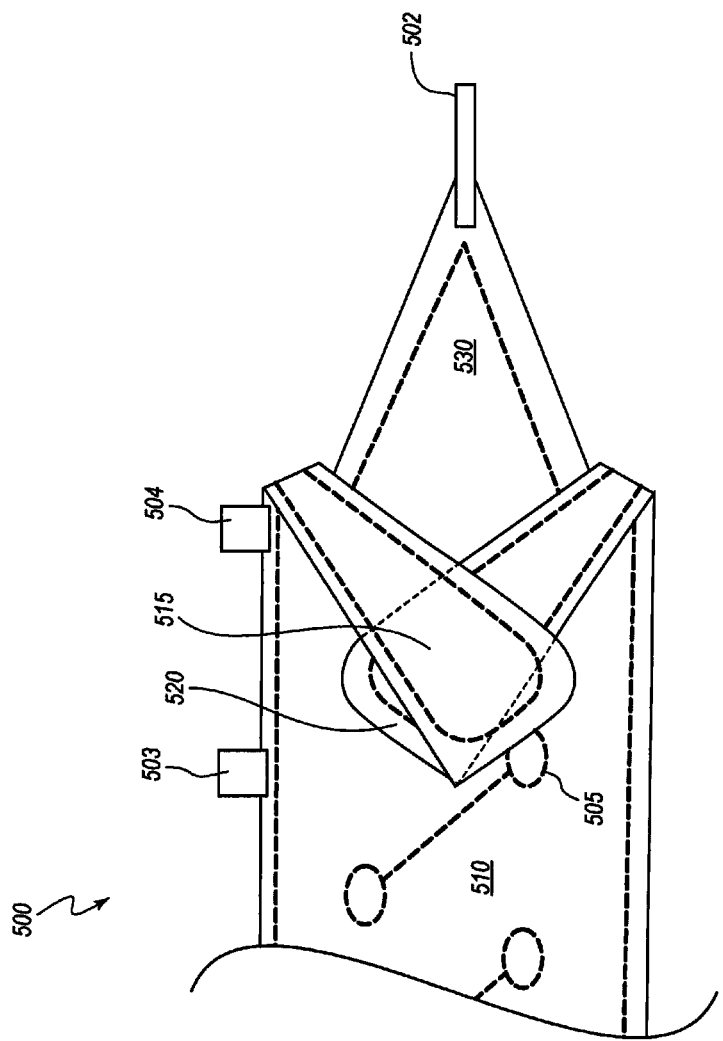
FIG. 5B illustrates the front view of the airbag module with the lobes folded with respect to the base portion and partially overlapping in an unassembled and undeployed state.

FIG. 5B illustrates the front view of the airbag module 500 with the lobes 515 and 520 folded with respect to the base portion 510. As illustrated the lobes 515 and 520 are folded inward so as to substantially overlap one another. In alternative embodiments, the lobes may be folded with more or less overlap. The length, thickness, and shape of each of the lobes may vary based on a particular application or desired inflated shape. Additionally, the first lobe 515 and the second lobe 520 may not be symmetrical nor necessarily be configured to inflate the same amount.

Figure 5C:
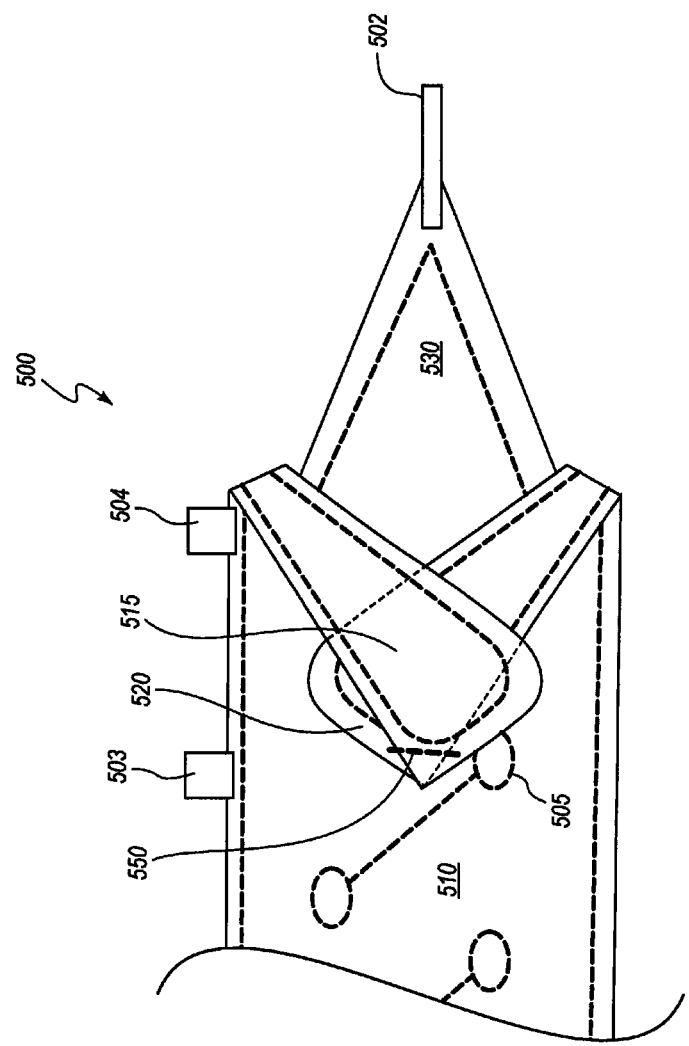
FIG. 5C illustrates the front view of the airbag module with the lobes sewn together while folded with respect to the base portion and partially overlapping in an assembled and undeployed state.

FIG. 5C illustrates the front view of the airbag module 500 with the lobes 515 and 520 sewn together while folded with respect to the base portion 510 and partially overlapping in an assembled, but undeployed state. As illustrated in FIG. 5C, prior to packing the airbag module 500, the lobes 515 and 520 are folded with respect to the base portion 510 and slightly inward so as to overlap one another. In some embodiments, a middle or end portion of the lobes 515 and 520 may be wide enough that they overlap when folded without necessarily being folded inward.

After being folded, the lobes 515 and 520 may be sewn, at 550, such that they cannot (without being deformed) return to their unfolded state (depicted in FIG. 5A), in which the lobes 515 ad 520 extend substantially along the same plane as the base portion 510. Rather, the lobes 515 and 520 may be packaged in the folded and sewn (or otherwise joined) state depicted in FIG. 5C. In some embodiments, the airbag module 500 may be additionally folded and/or rolled for packaging.

Figure 5D:
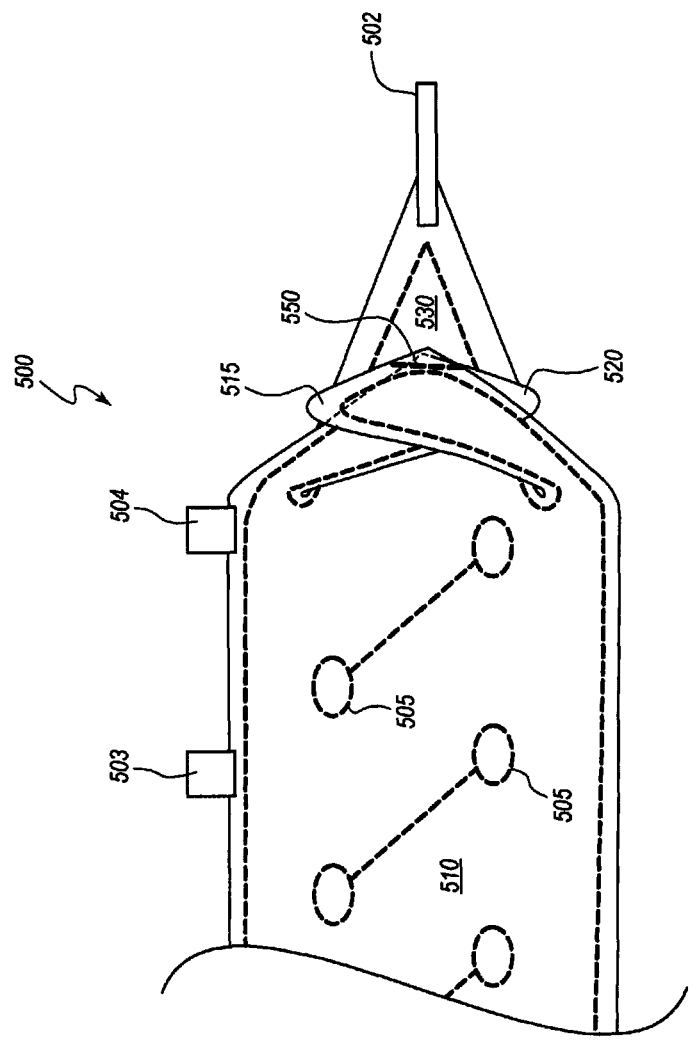
FIG. 5D illustrates the front view of the airbag module in an inflated state with the lobes remaining joined and extending inboard from the base portion.

As depicted in FIG. 5D, in an inflated state, the lobes may remain joined, at 550, and prevented from returning to the unfolded state (depicted in FIG. 5A). Instead, the inflated and joined lobes 515 and 520 may extend inboard from the base portion 510 at an angle relative to the base portion 510. The three-dimensional characteristic of the airbag module 500 is illustrated in FIG. 5D with the inflated base portion 510 lying substantially in the plane parallel to the page. The inflated base 510 curves or bends at the junction of the base portion 510 and the inflated lobes 515 and 520 to form a pocket region with the inflated lobes extending outward from the page. For example, the lobes 515 and 520 may extend perpendicular to the base portion 510 or at another angle, e.g., acute or obtuse, so as to form a pocket in conjunction with the base portion 510. The sail portion 530 may also inflate and remain either in substantially the same plane as the base portion 510 or at an angle relative to the base portion 510 based on contact with a portion of a vehicle structure.

Figure 5E:
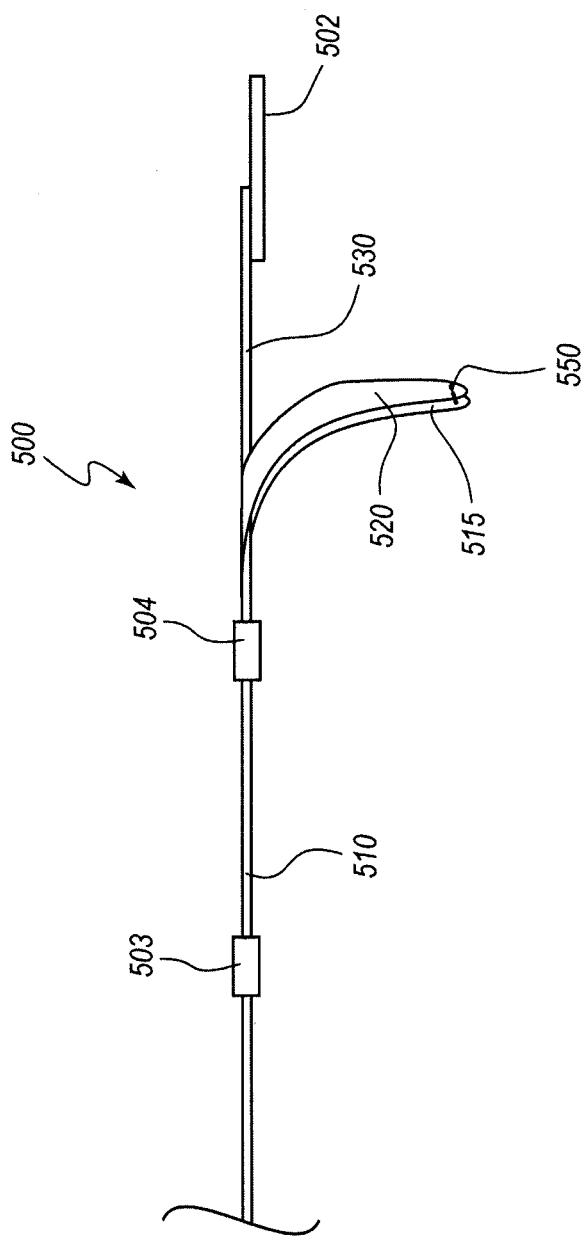
FIG. 5E illustrates a top view of the airbag module in the inflated state with the lobes remaining joined and extending inboard from the base portion.

FIG. 5E illustrates a top view of the airbag module 500 in the inflated state with the lobes 515 and 520 remaining joined, at 550, and extending inboard from the base portion 510. It will be apparent to one of skill in the art that the base portion 510, the lobes 515 and 520, and the sail portion 530 may inflate substantially more than illustrated. However, FIG. 5E is intended to provide a clear example of the bending cushion region that forms a pocket near the junction of the base portion 510 and the lobes 515 and 520.

In various embodiments, a base portion (or multiple base portions of a single airbag module) may include any number of lobes (in pairs) configured to provide bending cushion regions. For example, a frontal impact airbag may include a base portion with a pair of lobes to the left and a pair of lobes to the right, such that the frontal impact airbag is configured to "catch" a vehicle occupant and prevent, limit, and/or cushion lateral movement to the left and right of the centered base portion.

Additionally, the various embodiments described herein include at least two lobes that are folded and joined, such as via stitching. Alternatively, the lobes can be joined together in any suitable manner, such as via a seam, one or more adhesives, taping, welding (e.g., radio frequency welding), heat sealing, or any other suitable technique or combination of techniques, and thus the junction of the lobes may comprise one or more of stitches, welds (e.g., radio frequency welds), and/or adhesives. In some embodiments, the junction of the lobes may comprise a single row of stitches. In other embodiments, the junction of the lobes may include multiple rows of stitches, which may aid in reinforcing the junction. Such options for forming seams and junctions apply equally to other seams in the airbag modules.

In any of the embodiments, one or more mounting apertures may be incorporated to facilitate mounting the airbag module within a vehicle. Any suitable mounting hardware is possible, such as bolts, screws, etc. The airbag modules may further define one or more venting apertures or venting tethers. The one or more venting apertures and/or tethers may permit or facilitate passive venting, such as when a vehicle occupant is cushioned by the airbag during ride down.

As used herein, the terms "upper," "lower," "inboard," and "outboard" refer to relative positions within the vehicle when the airbag is deployed. In other arrangements, such as where the airbag is used in vehicles having oppositely oriented driver and passenger sides and/or as a passenger side airbag, the inboard and outboard ends may be reversed.

References to approximations are made throughout this specification, such as by use of the terms "about," "approximately," or "substantially." For each such reference, it is to be understood that, in some embodiments, the value, feature, or characteristic may be specified without approximation.

Stated otherwise, the terms of approximation include within their scope the exact feature modified by the term of approximation. For example, it is noted that in various embodiments, the lobes may extend substantially perpendicular from the base portion in an inflated state. It is thus understood that in certain of such embodiments, the lobes may extend exactly perpendicular from the base portion in an inflated state.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. In many instances, the disclosure of the various embodiments of airbags and airbag modules herein inherently discloses or implies a method or steps of a method for forming, manufacturing, or packaging the airbag or airbag module. Such inherent or implied methods are considered within the scope of this disclosure.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag module comprising:
 an inflatable cushion configured to receive inflation gas from an inflator, wherein the inflatable cushion comprises:
  an inflatable base portion having a first end and a second end that define a first plane;
  a first inflatable lobe fluidly connected to and extending from the first end of the base portion along the first plane; and
  a second inflatable lobe fluidly connected to and extending from the first end of the base portion along the first plane, and
 wherein a portion of the first inflatable lobe is joined to a portion of the second inflatable lobe, such that:
  in an undeployed state, the first inflatable lobe and the second inflatable lobe are configured to be folded with respect to the base portion and remain substantially parallel to the first plane defined by the base portion, and
  in an inflated state, the first inflatable lobe and the second inflatable lobe remain joined and are configured to jointly extend inboard within a vehicle at an angle relative to the first plane.

2. The airbag module of claim 1, wherein the portion of the first inflatable lobe is sewn to the portion of the second inflatable lobe.

3. The airbag module of claim 1, wherein in the inflated state, the first inflatable lobe and the second inflatable lobe are configured to jointly extend inboard within the vehicle substantially perpendicular to the first plane defined by the base portion.

4. The airbag module of claim 1, wherein in the inflated state, the inflated first and second lobes are configured to form a pocket region in conjunction with the inflated base portion, and wherein the pocket region is configured to receive at least a portion of a vehicle occupant during a collision.

5. The airbag module of claim 1, wherein the first inflatable lobe is joined to the portion of the second inflatable lobe while the first and second lobes are folded with respect to the base portion, such that the first and second lobes cannot be completely unfolded with respect to the base portion.

6. The airbag module of claim 1, wherein the first inflatable lobe is joined to the portion of the second inflatable lobe while the first and second lobes are folded with respect to the base portion and the first and second lobes at least partially overlap one another.

7. The airbag module of claim 1, wherein in the deflated state, the first inflatable lobe and the second inflatable lobe are configured to be folded inward toward a center portion of the base portion and remain substantially parallel to the first plane defined by the base portion.

8. The airbag module of claim 1, wherein the inflatable cushion further comprises:
 an inflatable sail portion fluidly connected to and extending from the first end of the base portion, and
 wherein the inflatable sail portion is positioned between the first inflatable lobe and the second inflatable lobe.

9. The airbag module of claim 8, wherein the inflatable sail portion is triangular in shape with a base of the triangular shape fluidly connected to the first end of the base portion.

10. The airbag module of claim 8, further comprising a tether attached to the sail portion.

11. The airbag module of claim 1, wherein the base portion is configured to be mounted to the vehicle via one or more mounting apertures through which mounting hardware can extend.

12. The airbag module of claim 1, wherein the inflatable cushion further comprises:
 a third inflatable lobe fluidly connected to and extending from the second end of the base portion along the first plane; and
 a fourth inflatable lobe fluidly connected to and extending from the second end of the base portion along the first plane, and
 wherein a portion of the third inflatable lobe is joined to a portion of the fourth inflatable lobe, such that:
  in an undeployed state, the third inflatable lobe and the fourth inflatable lobe are configured to be folded with respect to the base portion and remain substantially parallel to the first plane defined by the base portion, and in an inflated state, the third inflatable lobe and the fourth inflatable lobe remain joined and are configured to jointly extend inboard within a vehicle at an angle relative to the first plane.

13. The airbag module of claim 12, wherein the portion of the third inflatable lobe is sewn to the portion of the fourth inflatable lobe.

14. The airbag module of claim 12, wherein in the inflated state, the third inflatable lobe and the fourth inflatable lobe are configured to jointly extend inboard within the vehicle substantially perpendicular to the first plane defined by the base portion.

15. The airbag module of claim 12, wherein in the inflated state, the inflated third and fourth lobes are configured to form a second pocket region in conjunction with the inflated base portion, and wherein the second pocket region is configured to receive at least a portion of a vehicle occupant during a collision.

16. The airbag module of claim 12, wherein the third inflatable lobe is joined to the portion of the fourth inflatable lobe while the third and fourth lobes are folded with respect to the base portion, such that the third and fourth lobes cannot be completely unfolded with respect to the base portion.

17. The airbag module of claim 12, wherein the third inflatable lobe is joined to the portion of the fourth inflatable lobe while the third and fourth lobes are folded with respect to the base portion and the third and fourth lobes at least partially overlap one another.

18. The airbag module of claim 12, wherein in the deflated state, the third inflatable lobe and the fourth inflatable lobe are configured to be folded inward toward a center portion of the base portion and remain substantially parallel to the first plane defined by the base portion.

19. The airbag module of claim 12, wherein the inflatable cushion further comprises:
a second inflatable sail portion fluidly connected to and extending from the second end of the base portion, and
wherein the inflatable sail portion is positioned between the third inflatable lobe and the fourth inflatable lobe.

20. An airbag module comprising:
an inflatable cushion configured to receive inflation gas from an inflator, wherein the inflatable cushion comprises:
an inflatable base portion configured to inflate substantially with respect to a first plane; and
at least one inboard extension portion, each inboard extension portion comprising:
a first inflatable lobe fluidly connected to and extending from the base portion along the first plane; and
a second inflatable lobe fluidly connected to and extending from the base portion along the first plane, and
wherein a portion of the first inflatable lobe is joined to a portion of the second inflatable lobe while the first and second inflatable lobes are folded with respect to the base portion and at least partially overlapping one another, such that:
in an undeployed state, the first inflatable lobe and the second inflatable lobe are configured to remain folded and substantially parallel to the plane defined by the base portion, and
in an inflated state, the first inflatable lobe and the second inflatable lobe remain joined and are configured to jointly extend inboard within a vehicle at an angle relative to the first plane.

* * * * *